United States Patent [19]

Schönfelder

[11] Patent Number: 5,040,765

[45] Date of Patent: Aug. 20, 1991

[54] CANTILEVER SUPPORT SYSTEM FOR TAKING UP OBJECTS RUNNING ON ROLLER WHEELS

[75] Inventor: Jürgen Schönfelder, Unterschleissheim, Fed. Rep. of Germany

[73] Assignee: F.M.K. Kreuzer GmbH & Co. KG, Puchheim, Fed. Rep. of Germany

[21] Appl. No.: 525,123

[22] Filed: May 17, 1990

[30] Foreign Application Priority Data

May 24, 1989 [DE] Fed. Rep. of Germany ....... 3916976

[51] Int. Cl.⁵ .................... B65G 7/00; B60T 3/00
[52] U.S. Cl. .................... 248/669; 16/35 R; 188/32; 248/327; 414/626; 414/669
[58] Field of Search ............... 248/324, 333, 327, 282, 248/283, 121, 639, 669; 414/671, 668, 630, 633, 580, 626, 669; 187/8.77; 16/35 R; 188/32; 269/59, 58

[56] References Cited

U.S. PATENT DOCUMENTS

| | | | |
|---|---|---|---|
| 1,803,942 | 5/1931 | Lunati | 188/32 |
| 1,915,320 | 6/1933 | Jones | 188/32 |
| 3,004,631 | 10/1961 | Clarke | 187/8.77 |
| 3,811,536 | 5/1974 | Haynes | 188/32 |
| 3,826,392 | 7/1974 | Farley | 414/630 |
| 4,120,384 | 10/1978 | Choy | 16/35 R |
| 4,314,735 | 2/1982 | Fullenkamp et al. | 248/346.1 X |
| 4,993,683 | 2/1991 | Kreuzer | 248/669 X |

Primary Examiner—Carl D. Friedman
Assistant Examiner—Derek J. Berger
Attorney, Agent, or Firm—Donald Brown

[57] ABSTRACT

A support system comprises a cantilever for taking up objects running on roller wheels. The cantilever is formed to roll the objects onto the cantilever in a first direction up to a lock position and to remove them from the cantilever by rolling in a substantially opposite direction. The roller wheels shall be locked in a rest position and removal of the objects by rolling the roller wheels from the cantilever shall be eased. In order to achieve this object the cantilever comprises a depression formed at the lock position of the roller wheels and extending transversely to the roll-on direction. A substantially plane portion is provided at the roll-on side of the depression and a roller wheel arriving in the depression contacts said plane portion.

12 Claims, 3 Drawing Sheets

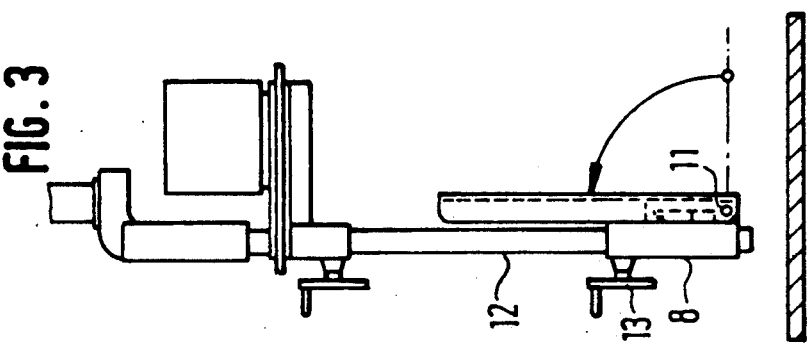
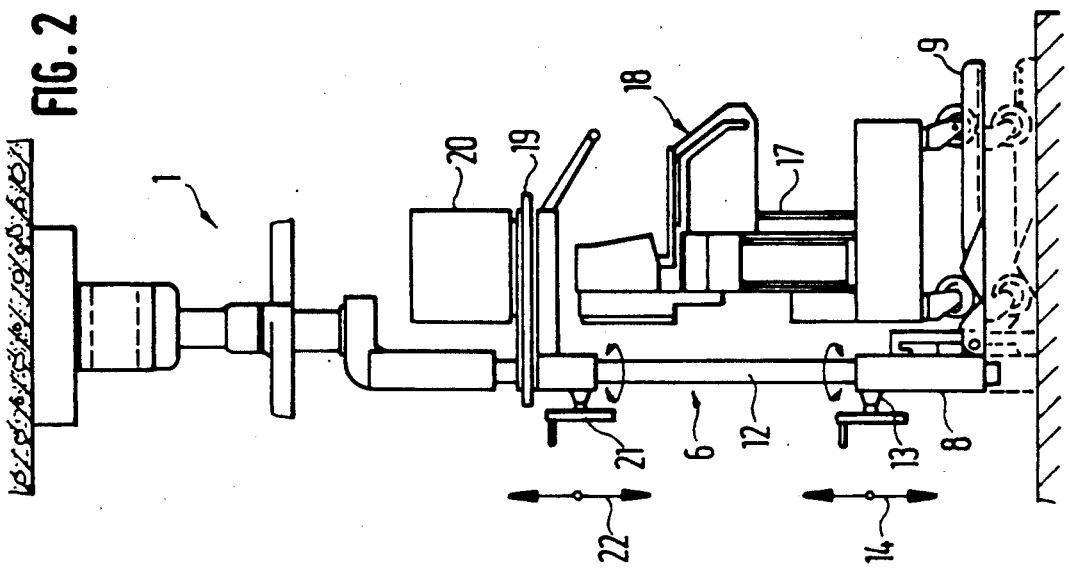
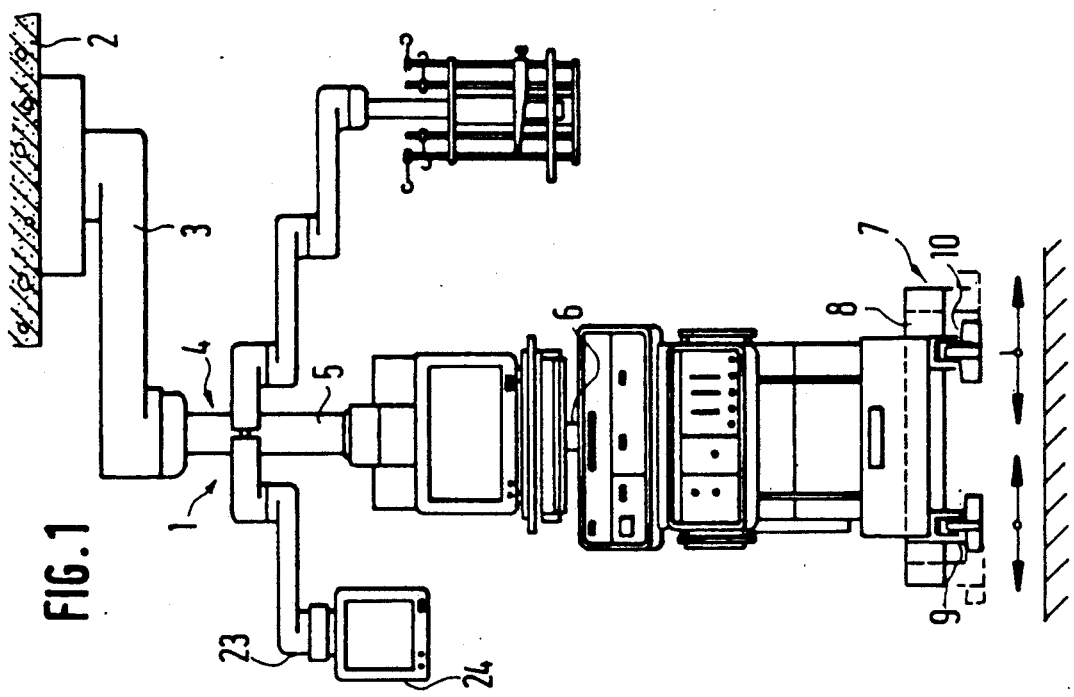

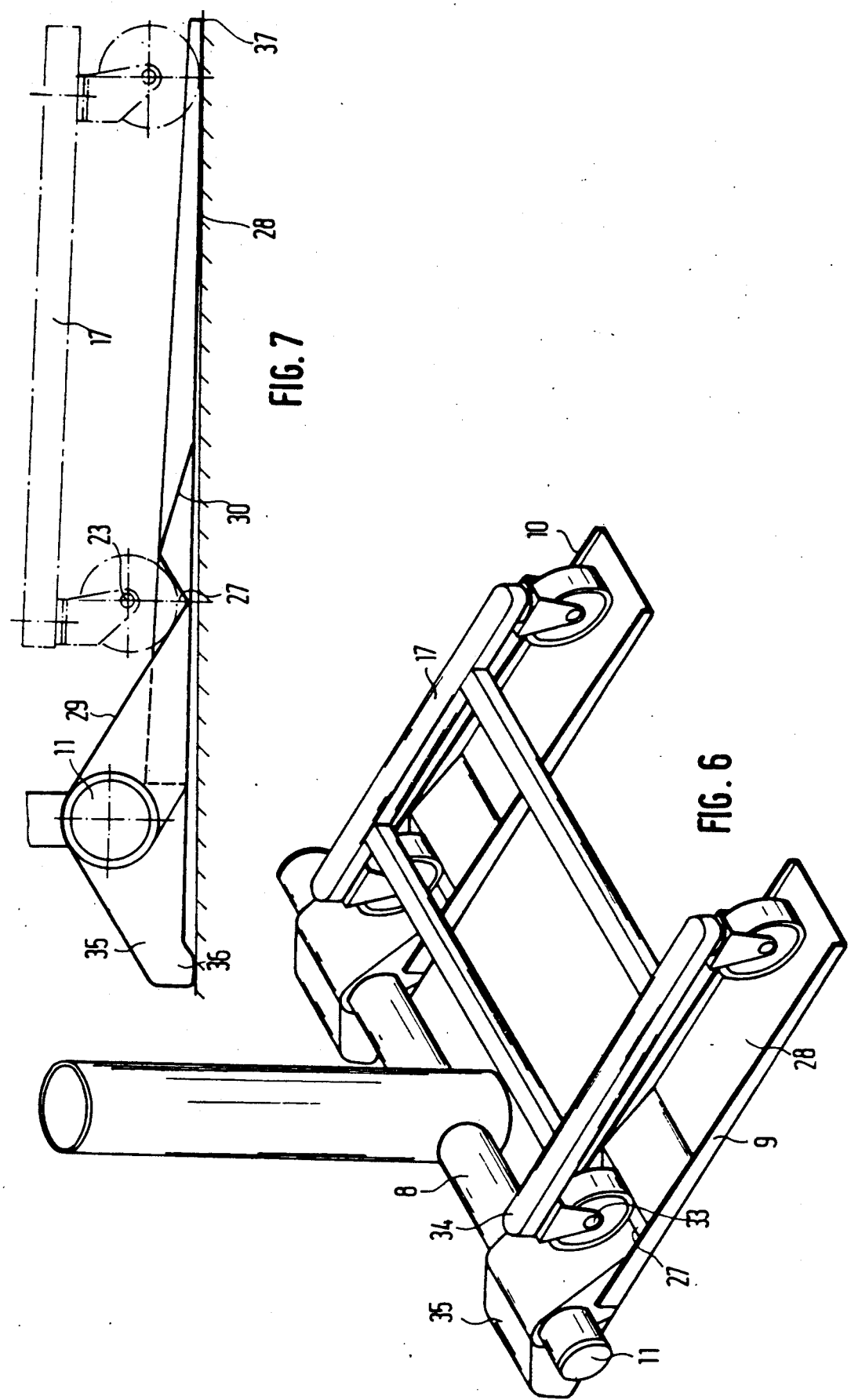

CANTILEVER SUPPORT SYSTEM FOR TAKING UP OBJECTS RUNNING ON ROLLER WHEELS

BACKGROUND OF THE INVENTION

The invention relates to a support system comprising a cantilever for taking up objects running on roller wheels. Such a system is in particular used in connection with supports for carrying medical appliances.

The post-published European Patent Application 88 120 738.5 discloses such a system forming part of an overhead support for carrying medical appliances. Two rails are provided at the base of the support and the roller wheels of an appliance are rolled onto these rails. A mechanical pin locking mechanism is provided for locking the rolled-on appliance and its roller wheels in a predetermined position. The rails have lateral limiting edges for guiding the roller wheels, the distance of the limiting edges being substantially equal to the width of the roller wheels. For removal of the trolley the lock is released and the roller wheels are guided in the same direction by engagement with the lateral rail portions.

OBJECTS OF THE INVENTION

It is an object of the invention to provide an improved support system. It is a further object of the invention to provide a support system which provides for easier locking of a rolled-on appliance in a determined position. It is a still further object of the invention to provide a support system which facilitates or simplifies the rolling back of the trolley in those cases in which the roller wheels are supported in such a manner that in a vertical projection the axis of the roller wheels does not coincide or intersect with the rotational axis of the roller wheel support in the appliance, said rotational axis extending perpendicular to the axis of the roller wheels.

SUMMARY OF THE INVENTION

According to the invention a support system comprises a cantilever for taking up objects running on roller wheels, said cantilever being formed to roll said objects onto said cantilever in a first direction up to a lock position and to remove them from said cantilever by rolling in a substantially opposite second direction, said cantilever comprising, at the location of at least one of the roller wheels when in locking position, a depression extending transversely to said first direction, said depression being formed by two mutually inclined planes which are both inclined with respect to the horizontal line.

BRIEF DESCRIPTION OF THE DRAWINGS

Further advantages, features and objects of the invention will stand out from the following description of an examplary embodiment with reference to the drawings. In the drawings FIG. 1 is a front view of an overhead support with a trolley received on the system;

FIG. 2 is a side view of an overhead support including the support system with several parts being removed, the lowest position of the overhead support and the support system being shown in dotted lines and the lifted position being shown in full lines;

FIG. 3 is a part view of the support system shown as side view in FIG. 2 with folded-up rails.

FIG. 6 shows a further improvement of the rails of a support system according to the invention; and FIG. 7 is a lateral view of the support system shown in FIG. 6 without the lateral limiting edges of the rail.

DESCRIPTION OF PREFERRED EMBODIMENTS

Figure 5:
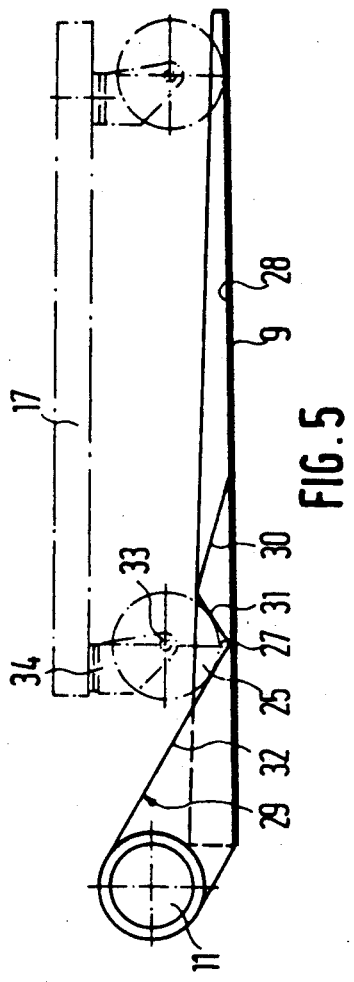
FIG. 5 is a lateral view of the representation of FIG. 4 wherein the facing lateral limiting edge of the rail has been omitted.

The overhead support 1 comprises an extension arm 3 for attachment at a ceiling 2 through a joint, and a column 4 rotatably connected to the extension arm. The column 4 comprises a first portion 5 connected to the extension arm 3 and a second portion 6 formed by column 12. At the bottomside end of the column 12 a cantilever 7 forming an appliance receiving means. The cantilever or appliance receiving means is provided 7 comprises a sleeve 8', which is vertically adjustable on column 12, said sleeve terminating at its bottom end with a yoke 8 extending transversely to the sleeve 8' and the column 12. As may in particular be seen from FIGS. 2 and 3, a pair of rails 9, 10 is hingedly connected with the yoke 82 extending in horizontal direction with respect to column 12A. In this way, the rails may be folded up a rest position in the manner shown in FIG. 3.

In the present embodiment, the sleeve 8 is connected to the the column 12 by a rack and pinion drive 13. By operating this drive the appliance receiving means 7 may be lifted and lowered in direction of the arrow 14 between an operational position shown in FIG. 2 in full lines and a lowered position shown in dotted lines. The level adjustment is advantageously performed by means of a crank handle which makes contact banks or similar savety devices superfluous. In place of the hand-operated level adjusting mechanism, however, the level adjustment may alternatively be performed by means of a motor drive.

By means of a guide mechanism provided at the yoke 8 and schematically sketched in FIG. 1 or by means of the hinged connection of the rails 9, 10 to the yoke 8 as shown in FIG. 4–7 the distance between both rails can be varied between a narrow position shown in full lines in FIG. 1, and a wide position shown in dotted lines, as indicated by the arrows in FIG. 1. In this manner, it is possible to adapt the distance between the rails to appliances having various roller wheel distances of the haulage cars or trollies.

In the embodiment of FIG. 1–3, the pivotable connection between the yoke 8 and the rails 9, 10 is realized by a joint 11 provided at the yoke. In the embodiment of FIG. 4–7, the yoke 8 has a cylindrical shape and the rails 9, 10 are provided with an attachment 11 having a corresponding cylindrical bore thus As may be best seen from the FIGS. 4 and 5, the rails are provided with a depression or recess 27 extending downwardly and transversely to the direction of the roll-on direction at one end a position where the leading roller wheels 25, 26 rolled first onto the rails are to be locked for fixing the rest position of the appliance. In the embodiment shown, the depression is formed by mounting a sheet metal member 29 onto the base 28 of the rail. This sheet metal member 29 is formed to have, as seen in roll-on direction, a rising first portion 30 formed as a roll-on ramp, a following second portion 31 declining to the bottom of the depression, and a following third portion 32 rising from the bottom of the depression. The second and third portion 31, 32 are preferably inclined at an angle of about 20° to 40° and particular preferably around 30° with respect to a horizontal line. The length of the second portion and length of the third portion are selected in relation to the roller wheels to be used, such that each length is greater than the distance from the bottom of the depression to the contact point between the roller wheel and the respective portion. This means that a respective substantially straight or plane portion remains between the contact point and the edge towards the first portion 30. As may be in particular seen from FIG. 4, the width of the rails 9, 10 is considerably greater than the width of the roller wheels 25, 26.

In the embodiment shown in FIG. 4, the depression is formed simply by lying the sheet metal member described above and showing its sectional profile in FIGS. 4 and 5 onto the base of the rail. The depression may also be formed by forming a respective transverse recess within the base 28 of the rails itself by stamping or any other operation. However, the above described embodiment can be manufactured in an easy manner.

Figure 4:
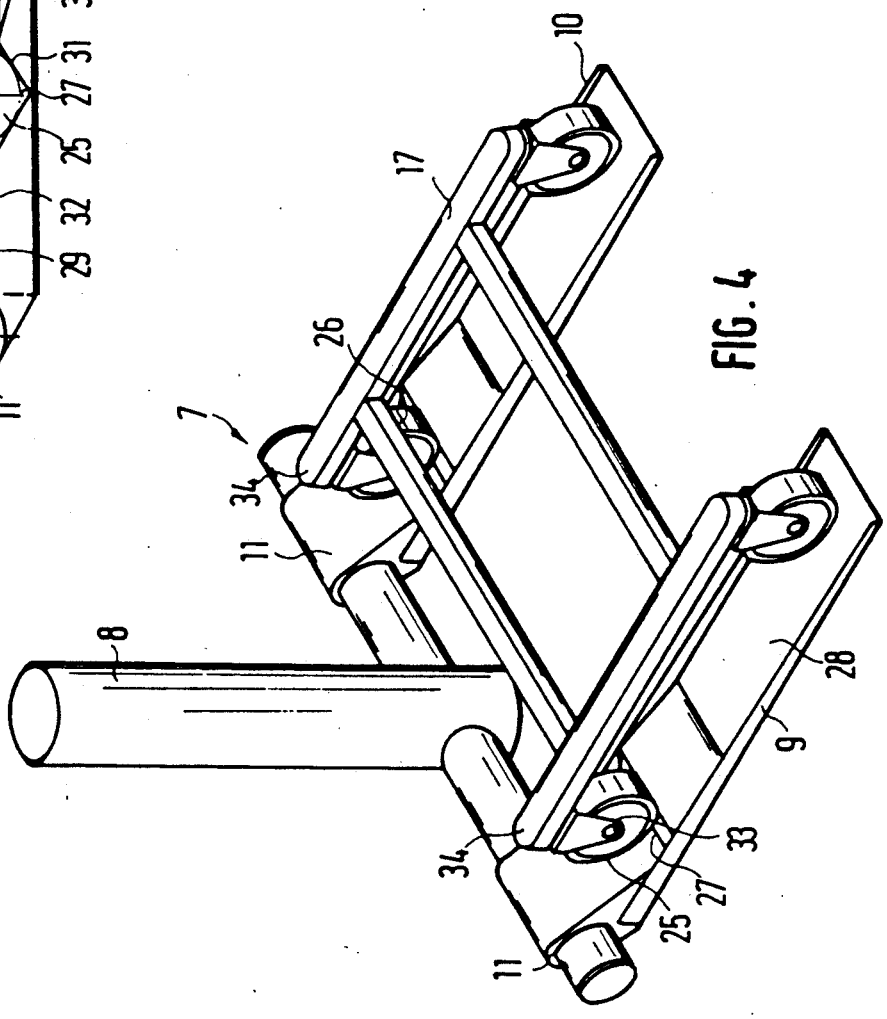
FIG. 4 is a perspective view of the support system having the lower part of a trolley rolled thereon.

In operation the haulage car or trolley 17 is simply rolled into the rest position shown in the FIGS. 4 and 5. The roller wheels 25, 26 automatically take the position shown in which the wheel axes 33, in vertical projection and seen in rolling direction of the trolley, lie behind the respective vertical axis of rotation 34 for the mounting of the roller wheel support to the trolley. As soon as the roller wheels have entered the depression the trolley is secured against displacement. Whenever the trolley shall be removed from the rails the form of the depression and the width of the rails cause the effect that the roller wheels lying in the depression first pivot around the axis of rotation 34 such that the wheel axis 33 is rotated substantially by 180° around axis 34 and thereafter the roller wheels are drawn in opposite direction over the second portion, the ramp-like first portion and the base of the rails. Owing to the aforementioned inclination of the second and third portion the roller wheels are sufficiently secured in the desired rest position and simultaneously the wheels pivot in the above described manner around the axis 34 during the removal and the roll-off from the rails is therefore particularly facilitated.

In the embodiment shown in the FIGS. 6 and 7 a respective projection 35 is provided at the side of the hinge 11 opposite to the rails 9, 10. The projection is formed unitary with the rails and thus rotates therewith around the hinge 11. The projection 35 is formed to have the free bottom end 36 of the projection 35 lying essentially in a plane together with the free bottom end 37 of the rails. This plane extends at an angle of 90° with respect to the vertical column 4 whenever the rails take their folded-down working position shown in FIG. 7. It is the advantage of this embodiment that the roll-on ends 37 of the rails 9, 10 firmly rest on the ground when lowering the appliance receiving means and do not project upwardly even in case of a slight unevenness of the ground. Preferably the free end of the projection 35 is formed as a downwardly projecting nose 36 such that a clearance remains between the rail and the ground in the region between the nose 36 and the free end 37.

A first monitor support 19 for supporting a first monitor 20 is provided at the support at a level above an anaesthetic appliance 18 in the operational position thereof. The level of the monitor support is adjustable on the rack 12 in direction of the arrow 22 independently of the level of the appliance receiving means 7 through a respective spindle 21. The appliance receiving means 7 as well as the first monitor support are further pivotable around the axis of the column in the manner indicated by the arrows shown in FIG. 2. The overhead support carries a second monitor support 23 which is mounted to the first portion 5 of the column in a fixed manner with respect to the axial direction of the column. Alternatively the first monitor support 19 may also be connected with the first portion 5 of the column.

In operation both monitors 20 and 24 are adjusted to have a suitable inclination relative to the work place. The anaesthetic appliance 18 together with the carriage or trolley 17 is stationarily locked on the rails 9, 10 by rolling into the depression and lifted upwards by means of the spindle 13 to obtain ground clearance such that the anaesthetic appliance can be pivotted around the axis of the second portion. The anaesthetic appliance is connected with (not shown) supply lines passed through the stationary first portion of the column.

Whenever the anaesthetic appliance shall be moved to another place the appliance receiving means is lowered into the position shown in dotted lines in FIG. 2. Then the appliance together with the trolley is rolled away. If desired, the same or a different appliance can again be rolled onto the rails at any time. If the carriage of a different appliance has a differing wheel distance the rails are laterally displaced relative to each other for adaptation to the respective wheel distance. The received carriage is again lifted up into the position shown in full lines. If no carriage is rolled-on the rails are folded up into the position shown in FIG. 3. It is not necessary to change the level or elevation of the remaining devices, neither when removing an appliance, nor when receiving a new appliance. This is an essential advantage since it allows to avoid any re-adjustment of the inclination of the monitors which once had been properly adjusted for the working place.

Although the invention has been described with reference to a specific example embodiment it is to be understood that it is intended to cover all modifications and equivalents within the scope of the appended claims.

What is claimed is:

1. Support system comprising a cantilever for taking up objects running on roller wheels, said roller wheels having a vertical axis and a horizontal axis which are offset from each other, said cantilever being formed to roll said objects onto said cantilever in a roll-on direction up to a lock position, and to remove them from said cantilever by rolling in a substantially opposite second direction, said cantilever comprising, at the location of at least one of the roller wheels when a lock position, a depression extending downwardly and transversely to said roll-on direction, said depression being formed by two mutually inclined planes which are both inclined with respect to a horizontal line and which has a lateral dimension perpendicular to said roll-on direction which is larger than the width of said roller wheel, thereby allowing rotation of said roller wheel around its vertical axis when said object is rolled off said cantilever.

2. The support system of claim 1, said two planes being each inclined at an angle of about 20° to 40° with respect to the horizontal line.

3. The support system of claim 1, wherein the plane at the roll-on side is inclined at an angle of about 30° with respect to the horizontal line.

4. The support system of claim 1, comprising a sheet metal forming said depression, said sheet metal forming a roll-on ramp on the roll-on side ahead of said depression.

5. The support system of claim 1, comprising a pair of said depressions, the transverse distance between said depressions corresponding to the transverse distance of a pair of said wheels.

6. The support system of claim 1, wherein said depressions are provided on two rails.

7. The support system of claim 6, comprising means for adjusting the distance between said two rails perpendicular to said roll-on position.

8. The support system of claim 6, comprising a hinge provided at the end of said rails adjacent to said column for folding-up said rails around said hinge.

9. The support system of claim 8, wherein a projection is rigidly connected with each rail at a position opposite to said rails with respect to said hinge.

10. The support system of claim 9, comprising a nose provided at the bottom side of said projection.

11. The support system of claim 1, comprising a yoke extending transversely to a lower second portion of said column, said rails being mounted to said yoke.

12. The support system of claim 1, comprising a support with a column, said cantilever being mounted to the bottom end of said column.

* * * * *